(12) United States Patent  
Ganu et al.

(10) Patent No.: US 11,405,973 B2
(45) Date of Patent: Aug. 2, 2022

(54) DETECTING NETWORK CONNECTIVITY ANOMALIES WITH PRESENCE ANALYSIS (71) Applicant: Hewlett Packard Enterprise Development LP, Houston, TX (US)

(72) Inventors: Sachin Ganu, San Jose, CA (US); Kenneth Chan, Santa Clara, CA (US); Kiran Ashokan, Santa Clara, CA (US); Rajesh Bhagwat, Santa Clara, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 17/121,953

(22) Filed: Dec. 15, 2020

(65) Prior Publication Data
US 2021/0100057 A1    Apr. 1, 2021

Related U.S. Application Data (63) Continuation of application No. 16/112,603, filed on Aug. 24, 2018, now Pat. No. 10,880,944.

(51) Int. Cl.
*H04W 76/18* (2018.01)
*H04W 64/00* (2009.01)
*H04W 84/12* (2009.01)
*H04W 4/80* (2018.01)
*G06N 20/00* (2019.01)

(52) U.S. Cl.
CPC ............ *H04W 76/18* (2018.02); *G06N 20/00* (2019.01); *H04W 64/00* (2013.01); *H04W 4/80* (2018.02); *H04W 84/12* (2013.01)

(58) Field of Classification Search
CPC combination set(s) only.
See application file for complete search history.

(56) References Cited

U.S. PATENT DOCUMENTS

| 7,937,336 | B1 * | 5/2011 | Maynard-Zhang | ..... H04L 67/18 706/12 |
| 9,189,900 | B1 * | 11/2015 | Penilla | ...................... H04L 9/14 |
| 9,408,041 | B1 | 8/2016 | Abehassera et al. | |
| 2005/0066033 | A1 | 3/2005 | Cheston et al. | |
| 2012/0050018 | A1 | 3/2012 | Sajadi et al. | |

(Continued)

FOREIGN PATENT DOCUMENTS

CN            106131767 A         11/2016

OTHER PUBLICATIONS

Zou et al., "Bluedetect: an Ibeacon-enabled Scheme for Accurate and Energy-efficient Indoor-outdoor Detection and Seamless Location-based Service," Feb. 22, 2016, 21 pages, https://www.ncbi.nlm.gov/pmc/articles/PMC4801644/.

*Primary Examiner* — Yee F Lam
(74) *Attorney, Agent, or Firm* — Sheppard Mullin Richter & Hampton LLP (57) ABSTRACT

A method including identifying that a client device is physically presented within a coverage area corresponding to a network is provided. The client device is associated with a user having a user credential to log in to the network, and the method includes determining that the client device has not requested to log in to the network using the user credential, and generating an alert to an administrator of the network responsive to both (1) that the client device is physically presented within the coverage area and (2) that the client device has not requested to log in to the network.

20 Claims, 5 Drawing Sheets

(56) References Cited

U.S. PATENT DOCUMENTS

| | | |
|---|---|---|
| 2014/0068522 A1 | 3/2014 | Lim et al. |
| 2015/0099469 A1 | 4/2015 | Goldstein |
| 2015/0180874 A1* | 6/2015 | Ootani ................ G06F 21/6245 726/3 |
| 2015/0234678 A1 | 8/2015 | Kim et al. |
| 2016/0094423 A1* | 3/2016 | Parthasarathy ..... H04L 61/6018 709/224 |
| 2016/0192131 A1 | 6/2016 | Gaver et al. |
| 2016/0226713 A1 | 8/2016 | Dellinger et al. |
| 2017/0097797 A1* | 4/2017 | Yasuno ................. G06F 3/1222 |
| 2017/0150305 A1 | 5/2017 | Chaudhri et al. |
| 2017/0223579 A1 | 8/2017 | Lee et al. |
| 2017/0262015 A1 | 9/2017 | Li et al. |
| 2018/0035290 A1 | 2/2018 | Dowlatkhah et al. |
| 2018/0035291 A1 | 2/2018 | Dowlatkhah et al. |
| 2018/0213478 A1 | 7/2018 | Baron et al. |
| 2019/0087557 A1* | 3/2019 | Moran ................. G06V 10/147 |
| 2020/0097817 A1* | 3/2020 | Harris ................... G06N 20/20 |

\* cited by examiner

DETECTING NETWORK CONNECTIVITY ANOMALIES WITH PRESENCE ANALYSIS

BACKGROUND

Network connectivity issues are often overlooked by a local area network (LAN) when a specific connectivity mode (e.g., Wi-Fi) is unavailable, inactive, or dysfunctional. In some cases, unbeknownst to a network administrator, a device may still be communicatively coupled with the LAN via an alternative route, but the device is still left out of the LAN, thus losing relevant connectivity opportunities and adding to user frustration.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

In the following, detailed description, numerous specific details axe set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Network administrators monitor client devices from users, the client devices being communicatively coupled with a wireless network (e.g., W-Fi and the like). When a network administrator detects the presence of a client device it may record some of this information in a user profile stored in a database. The user profile may include user connectivity trends over extended periods of time, and other usage connectivity patterns for each of multiple users, including the network connectivity environment (such as the amount of time a user remains connected to a network). In some cases, the network administrator detects, for any given user, a deviation from its average connectivity pattern (e.g., beyond a pre-selected threshold) and flags the anomalous behavior. However, this reactive detection of an anomalous behavior or an out of the ordinary Wi-Fi connectivity for a given user may generate avoidable false triggers. False triggers in the above system may result, for example, when a user is genuinely away from the LAN (e.g., for travel, for medical leave and the like).

Embodiments as disclosed herein solve the above problem by leveraging location tracking applications operating in a mobile client device to detect the presence of a user within a LAN when the client device has not attempted to log into the network. In addition, by using alternative detection mechanisms, the present disclosure provides methods and systems to leverage whether an alert or remedial action is desirable to resolve a seeming anomaly in a connectivity of a client device.

Embodiments as disclosed herein include methods for detecting a user presence on the premises of a LAN using alternate mechanisms (other than Wi-Fi). When a user presence is verified, the method includes proactively monitoring the Wi-Fi connectivity for the user in the LAN.

The present disclosure addresses the problem arising in computer technology of finding remediation techniques when a network anomaly prevents a user from connecting with a client device to a LAN. The proposed solution includes using alternate presence detection analysis is network administrator to discover client devices that may be unable to connect using a certain connectivity mode, and to resolve the connectivity problem by wirelessly providing new configuration parameters to the client device, or refreshing the LAN connectivity protocols.

In some embodiments, an alternate presence detection mechanism includes a radio frequency (RF) module from a network device, such as u Bluetooth low energy (BLE) radio from an access point (AP). Accordingly, in some embodiments, a network device may include a mechanism to generate frequency scans and detect BLE activity from the client device, thus confirming the presence of the client device (and the user) within the LAN. In some embodiments, a server or network device that hosts the LAN may install a location tracking application in the client device, upon the user authorization, when the cheat device is initialized and registered within the LAN.

Further, some embodiments include monitoring the LAN to find users and client devices associated with specific Wi-Fi addresses probing for the LAN within a specified amount of time. The specific Wi-Fi addresses may be retrieved from a history log in a database, and a machine learning algorithm running in the server or even in the network device.

Embodiments as disclosed herein provide a technical solution to providing reliable and robust connectivity in the field of computer networks by exercising proactive connectivity monitoring for client devices and detecting network onboarding failures. State-of-the-art technologies fail to detect network connectivity issues because these are masked when the client devices simply switch to alternate connectivity modes to the LAN, such as cellular or hotspot networking.

Embodiments as disclosed herein also provide multiple indicators to confirm a presence of the user associated with a client device, thereby substantially reducing likelihood of false triggering a Wi-Fi network anomaly response is also reduced.

In one embodiment of the present disclosure, a computer-implemented method is described that includes identifying that a client device is physically presented within a coverage area comes on a network, wherein the client device is associated with a user having a user credential to log in to the network. The computer-implemented method includes determining that the client device has not requested to log in to the network using the user credential, and generating an alert to an administrator of the network responsive to both (1) that the client device is physically presented within the coverage area and (2) that the client device has not requested to log in to the network.

According to one embodiment, a system is described eludes a memory storing instructions and one or more processors configured to execute the instructions to identify that a client device is physically presented within a coverage area corresponding to a network. The client device is associated with a user having a user credential to log in to the network, and the one, or more processors also execute instructions to determine that the client device has not requested to log in to the network using the user credential and to generate an alert to an administrator of the network responsive to both (1) that the client device is physically presented within the coverage area and (2) that the client device has not requested to log in to the network.

According to one embodiment, a non-transitory, machine-readable medium is described that includes instructions, which when executed by one or more processors, cause a computer to perform a method, the method including identifying that a client device is physically presented within a coverage area corresponding to a network, wherein the client device is associated with a user having a user credential to log in to the network. The method includes determining that the client device has not requested to log in to the network using the user credential, and generating an alert to an administrator of the network responsive to both (1) that the client device is physically presented within the coverage area and (2) that the client device has not requested to log in to the network.

In yet other embodiment, a system is described that includes a means for storing commands and a means for executing the commands causing the system to perform a method that includes identifying that a client device is physically presented within a coverage area corresponding to a network, wherein the client device is associated with a user having a user credential to log in to the network. The method includes determining that the client device has not requested to log in to the network using the user credential, and generating an alert to an administrator of the network responsive to both (1) that the client device is physically presented within the coverage area and (2) that the client device has not requested to log in to the network.

In one embodiment, a computer-implemented method as disclosed herein includes receiving, in a client device, a tracking query from a network device using a first connectivity mode, wherein the network device hosts a LAN. The computer-implemented method includes providing, to the network device, an identification information of the client device using the first connectivity mode, and receiving, from the network device, a query for a status of a second connectivity mode that is available for the LAN. The computer-implemented method also includes receiving, from the network device, a configuration parameter for the second connectivity mode, and accessing, with the client device, the LAN via the second connectivity mode.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Example System Architecture

Figure 1:
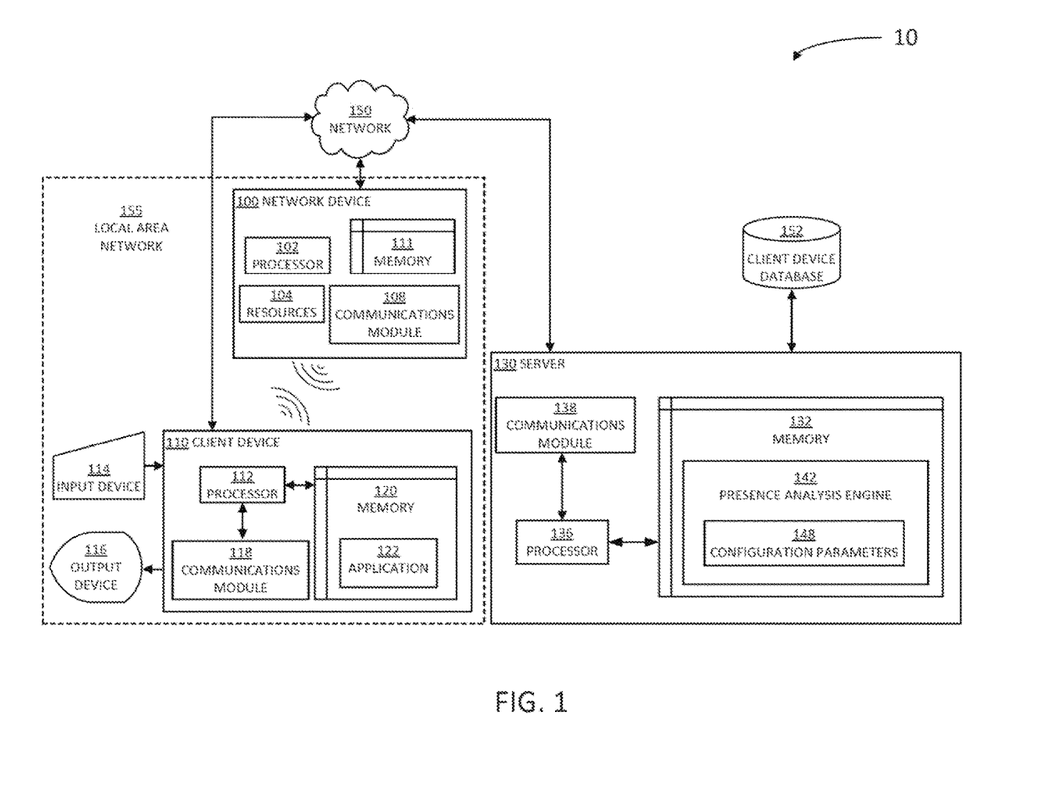
FIG. 1 is an architecture illustrating an example network device and client device suitable for a remotely controlled network device installation, according to certain aspects of the disclosure.

FIG. 1 illustrates an example architecture 10 suitable for a remotely controlled network device installation, according to some embodiments. Architecture 10 includes a server 130, a network device 100, and a client device 110 connected over a network 150, wherein network device 100 hosts client device 110 in a LAN 155. Furthermore, network device 100 may include an AP or an instant AP (IAP) for LAN 155. Server 130, network device 100, and client device 110 are configured to host memories 132, 111, and 120 including instructions which, when executed by one or more processors 136, 102, and 112 cause server 130, network device 100 and client device 110 to perform at least some of the steps in methods as disclosed herein. In some embodiments, a processor in client device 110 is configured to perform an application stored in a memory of client device 110.

Client device 110 may include a laptop, or a mobile device, a smart phone, a tablet, or any other portable computing device capable to communicate with server 130 through network 150 and with network device 100 through LAN 155. In that regard, client device 110 may include several types of devices, such as a desktop or a laptop, which, even in the case that client device 110 is mobile, it may be loosely or less often associated or co-located with a user. Another type of client device 110 may be more often or almost always associated or co-located with the user (e.g., a smart phone or another wearable device). For example, when LAN 155 is a company network, a client device 110 may be an "employee owned," or a "bring your own device" (BYOD) type device. In such circumstances, when network device 100 or server 130 detects the presence of client device 110 within LAN 155, there is a high likelihood of the physical presence of the user within LAN 155.

Network device 100 may be any device used to handle data communication in a LAN, e.g., a node, a switch, a multiplexer, a router, or an access point. In that regard, network device 100 may include any one of a wired terminal (e.g., a copper cable, a fiber optic cable), or a wireless and/or Internet of Things (IoT) terminal (e.g., Bluetooth, Zigbee, cellular network, and the like), or any combination thereof. Accordingly, network device 100 may be communicatively coupled with server 130 through network 150, and with client device 110 (e.g., a mobile phone, a smart phone, a tablet). In that regard, network devices 100 may include instant access points (IAPs) that can act as virtual controllers, routers, hubs, network switches, wireless controllers, and the like, and LAN 155 may be installed in retail a store, a businesses (e.g., restaurants, shopping malls, and the like), a factory, an office building, and the like. In that regard, LAN 155 may include one or more of network devices 100. Moreover, different network devices 100 may have different configuration settings in terms of requirements and capabilities, access and privileges, based on the specification of LAN 155, and intended purpose.

Network device 100 also includes a processor 102 and a memory 111 storing instructions to be executed by processor 102, and other data (e.g., installation configuration scripts provided by server 130). In some embodiments, network device 100 also includes resources 104 to handle networking operations within a LAN, WLAN, Wi-Fi; Bluetooth and the like, provided by network device 100 within a specific location. Resources 104 may include hardware and software components, such as radio-frequency (RF) antennas and controller circuits to scan LAN 155 and look for client devices 110 present therein (e.g., using a BLE radio), and the like.

Network 150 can include, for example, any one or more of a LAN (LAN), a wide area network (WAN), the Internet, and the like. Further, network 150 and LAN 155 can include, but are not limited to, any one or more of the following network topologies, including a bus network, a star network, a ring network, a mesh network, a star-bus network, tree or hierarchical network, and the like.

Network device 100 and client device 110 are communicatively coupled with server 130 over network 150 via communications modules 108, 118, and 138. Moreover, network device 100 and client device 110 may be communicatively coupled directly through communications modules 108 and 118, in LAN 155 hosted by network device 100. In that regard, network device 100 may include an AP or an IAP hosted by server 130 and servicing LAN 155. Communications modules 108, 118, and 138 are configured to interface with network 150 to send and receive information, such as data, requests, responses, and commands to other devices on the network. Communications modules 108, 118, and 138 can be, for example, modems or Ethernet cards.

Communication modules 108 and 118 may include a wireless communication antenna so that client device 110 may locally interact with network device 100 through a LAN, or on a device-to-device handshake basis. For example, in some embodiments, network device 100 may track the location of client device 110 via a tracking application installed in client device 110 (e.g., application 122).

Client device 110 may also be coupled with an input device 114 and an output device 116. Input device 114 may include a mouse, a keyboard, a touchscreen, and the like. Output device 116 may include a display, a touchscreen, a microphone, and the like. In some embodiments, input device 114 and output device 116 may be included in the same unit (e.g., a touchscreen).

In server 130, processor 136 is configured to execute instructions, such as instructions physically coded into processor 136, instructions stored in memory 132, or a combination of both. Client device 110 also includes a memory 120 storing instructions to be executed by processor 112, such as application 122. In some embodiments, application 122 may be installed in client device 110 by server 130 and perform scripts and other routines provided by server 130. Execution of application 122 may be controlled by a processor 112 in client device 110. For example, in some embodiments, client device 110 may be a mobile device (e.g., a smart phone, a tablet, and the like) roaming with the user in and out of LAN 155, and application 122 may include a tracking application providing a location information of client device 110 to server 130 or to network device 100. Installation of the tracking application may be performed by network device 100 or by server 130, upon authorization by the user of client device 110. In that regard, application 122 may include a web-based application that locates and tracks client device 110 through GPS and other hardware and software running over network 150, and hosted by server 130.

In server 130, memory 132 includes a presence analysis engine 142 configured to detect the presence of client device 110 within LAN 155. In some embodiments, presence analysis engine 142 has full access to a client device database 152. Presence analysis engine 142 may apply machine learning algorithms (e.g., neural networks, artificial Intelligence, and the like), to build multiple user profiles that are stored in client device database 152. The user profile includes the type of client device used by a user to log into LAN 155, the network device addressed (e.g., input access points), and the period of time that the connectivity lasted, patterns of connectivity, and the like. Client device database 152 may include a lookup table associating identification codes for a client device with multiple connectivity mode credentials of client device 110 for LAN 155. Furthermore, client device database 152 may also include an indication of a type of device associated with the client device. For example, in some embodiments, client device database 152 may indicate that a certain device is a laptop, or is a BYOD, or a user's personal smart phone.

Configuration parameters 148 include a list of settings and scripts including configuration settings and communication protocols for multiple connectivity modes between client device 110 and LAN 155. Accordingly, when client device 110 is de-configured, or at least one connectivity mode in client device 110 is disabled, erased, or reset (e.g., by error, damage, or at malicious attack), server 130 may provide a fresh copy of the missing configuration script to client device 110 from configuration parameters 148, directly through network 150, or through network device 100 and LAN 155.

Figure 2:
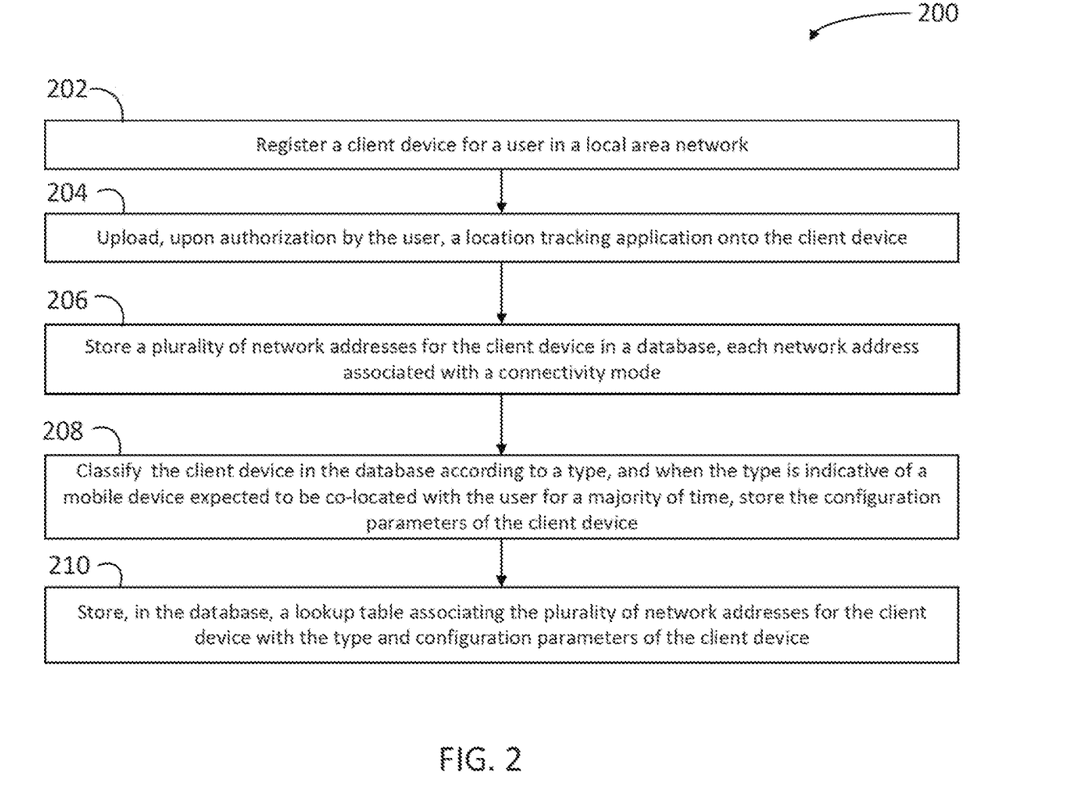
FIG. 2 is a flow chart illustrating steps in a method for registering a client device in a network, according to some embodiments.

FIG. 2 is a flow chart illustrating steps in a method 200 for registering a client device in a network, according to some embodiments. Method 200 may be performed at least partially by any one of a server or a network device while communicating with a client device (e.g., any one of server 130, network device 100, and client device 110). The server may be hosting a presence analysis engine configured to perform at least a portion of an application installed in a client device (e.g., presence analysis engine 142 and application 122). The client device may be handled by a user, wherein the user may be a client of a network (e.g., network 150 or LAN 155). At least some of the steps in method 200 may be performed by a computer having a processor executing commands stored in a memory of the computer (e.g., processors 102, 112 and 136, memories 111, 120 and 132). Further, steps as disclosed in method 200 may include retrieving, editing, and/or storing files in a database that is part of, or is communicably coupled to, the computer, using, inter alia, the presence analysis engine. The database may include a client device database (e.g., client device database 152). Methods consistent with the present disclosure may include at least some, but not all, of the steps illustrated in method 200, performed in a different sequence. Furthermore, methods consistent with the present disclosure may include at least two or more steps as in method 200 performed overlapping in time, or almost simultaneously.

Step 202 includes registering the client device in the LAN.

Step 204 includes uploading, upon authorization by the user, a location tracking application onto the client device.

Step 206 includes storing a plurality network addresses for the client device in the database, each network address associated with a connectivity mode.

Step 208 includes classifying the client device in the database according to a type (e.g., a desktop, a laptop, a smartphone, a user's personal device, a BYOD, and the like). When the type is indicative of a mobile device expected to be co-located with the user for a majority of time (e.g., a user's personal smart phone, a BYOD), store the configuration parameters of the client device.

Step 210 includes storing, in the database, a lookup table associating the plurality of network addresses for the client device with the type and configuration parameters of the client device.

Figure 3:
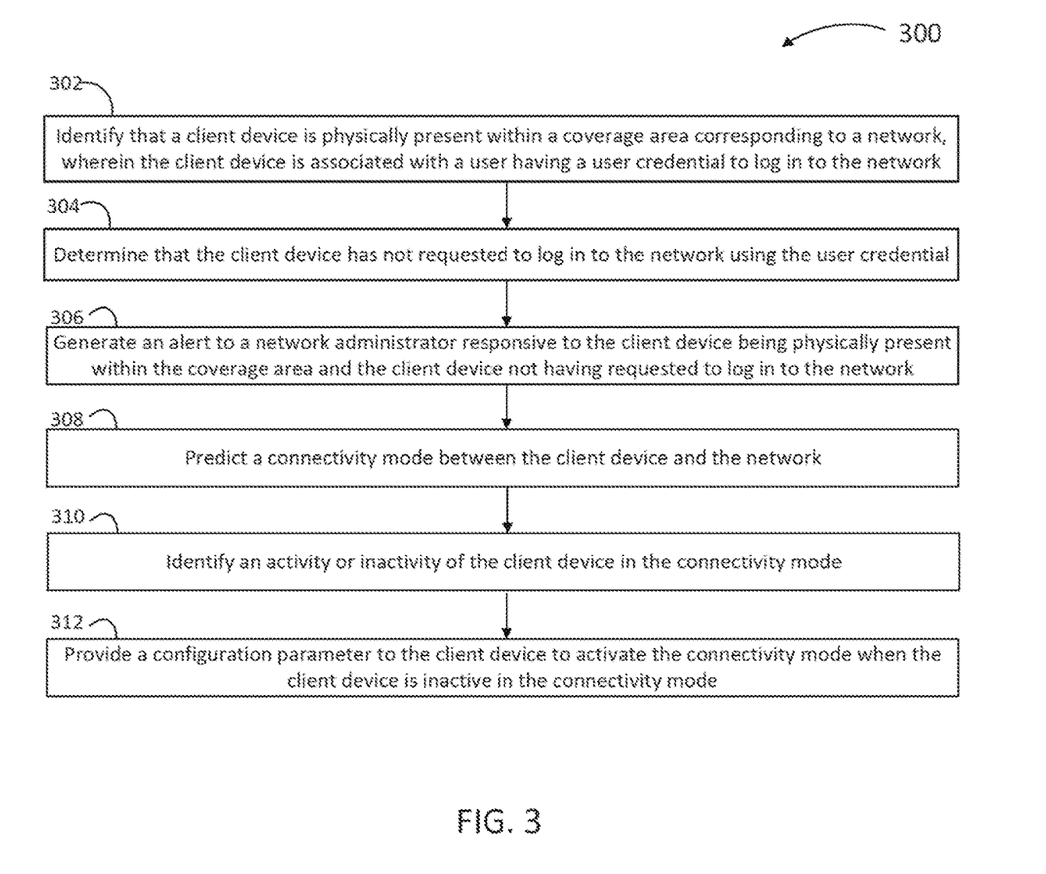
FIG. 3 is a flow chart illustrating steps in a method for detecting a network connectivity anomaly using presence analysis, according to some embodiments.

FIG. 3 is a flow chart illustrating steps in a method 300 for detecting a network connectivity anomaly using presence analysis, according to some embodiments. Method 500 may be performed at least partially by any one of a server or a network device while communicating with a client device (e.g., any one of server 130, network device 100, and client device 110). The server may be hosting a presence analysis engine configured to perform at least a portion of an application installed in a client device (e.g., presence analysis engine 142 and application 122). The client device may be handled by a user, wherein the user may be a client of a network (e.g., network 150 or LAN 155). At least some of the steps in method 300 may be performed by a computer having a processor executing commands stored in a memory of the computer (e.g., processors 102, 112 and 136, memories 111, 120 and 132). Further, steps as disclosed in method 500 may include retrieving, editing, and/or storing files in a database that is part of, or is communicably coupled to, the computer, using, inter alia, the presence analysis engine. The database may include a client device database (e.g., client device database 152). Methods consistent with the present disclosure may include at least some, but not all, of the steps illustrated in method 300, performed in a different sequence. Furthermore, methods consistent with the present disclosure may include at least two or more steps as in method 300 performed overlapping in time, or almost simultaneously.

Step 302 includes identifying that the client device is physically present within a coverage area corresponding to the network, wherein the client device is associated with a user having a user credential to log in to the network. In some embodiments, step 302 is performed in the network device with a radio (e.g., a BLE radio installed in an AP), the presence of the client device within a LAN can be detected, e.g., via a frequency scans and other activity detection from a BLE radio in the client device. In some embodiments, the application installed in the client device at the time of registering the client device to the LAN is a location tracking application (e.g., Wayfinding, and the like) and step 302 is at least partially performed in response to, or prompted by the location tracking application. In some embodiments, step 302 includes predicting a connectivity mode between the client device and the network based on a lookup table and a log in history for the client device in the network. In some embodiments, step 302 further includes identifying an absence of a connectivity mode, and providing a configuration parameter to the client device to activate an absent connectivity mode. In some embodiments, a connectivity mode includes a Wi-Fi connectivity mode and a Bluetooth connectivity mode, the method further comprising triggering a Wi-Fi network anomaly alert when the Bluetooth connectivity mode is active and the Wi-Fi connectivity mode is inactive. In some embodiments, step 302 selecting a connectivity mode to log the client device in the network from multiple wireless protocols associated with the client device in a lookup table, based on a machine learning determination.

Step 304 includes determining that the client device has not requested to log in to the network using the user credential. In some embodiments, step 304 includes predicting a log in of the client device in a selected connectivity mode based on a log in history of the client device with the network. In some embodiments, step 304 includes detecting a complete list of Wi-Fi addresses classified as BYOD associated with one or more BYOD-type client devices from the user, if to specific device address is not detected, flagging this event as a Wi-Fi connectivity network anomaly.

Step 306 includes generating an alert to a network administrator responsive to the client device being physically present within the coverage area and the client device not having requested to log in to the network. In some embodiments, step 306 includes identifying a type of the client device that is expected to be co-located with the user.

Step 308 includes predicting a connectivity mode between the client device and the network. In some embodiments, in response to a BLE detection, step 308 may include monitoring the LAN activity to find an expected Wi-Fi addresses for the client device, probing for the LAN within a specified amount of time. In some embodiments, the client device is configured to log, via one or more wireless protocols, to one or more networks and step 308 includes selecting one of the wireless protocols to log the client device into the network.

Step 310 includes identifying an activity or art inactivity of the client device in the connectivity mode. In some embodiments, step 310 may include detecting the complete list of the Wi-Fi addresses classified as BYOD category associated with the specific user. In some embodiments, step 310 includes monitoring for an expected connectivity mode from the client device based on the user credential and a lookup table stored in a database. When a specific address for the client device is not detected, step 310 includes flagging this event as a Wi-Fi connectivity network anomaly.

Step 312 includes providing a configuration parameter to the client device to activate the connectivity mode when the client device is inactive in the connectivity mode. In some embodiments, step 312 includes issuing an alert when an expected connectivity mode for the client device is not active.

Figure 4:
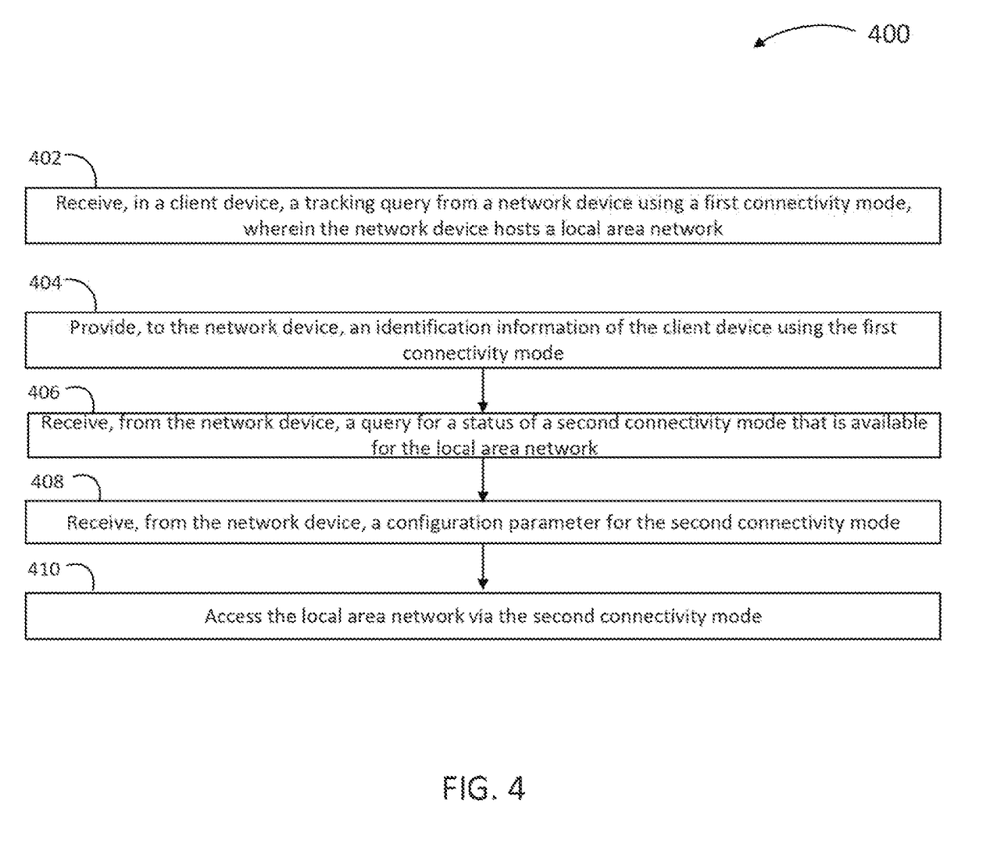
FIG. 4 is a flow chart illustrating steps in a method for logging, with a client device, into a network, according to some embodiments.

FIG. 4 is a flow chart illustrating steps in a method 400 for logging, with a client device, into a network, according to some embodiments. Method 400 may be performed at least partially by any one of a server or a network device while communicating with a client device (e.g., any one of server 130, network device, and client device 110). The server may be hosting a presence analysis engine configured to perform at least a portion of an application installed in a client device (e.g., presence analysis engine 142 and application 122). The client device may be handled by a user, wherein the user may be a client of a network (e.g., network 150 or LAN 155). At least some of the steps in method 400 may be performed by a computer having a processor executing commands stored in a memory of the computer (e.g., processors 102, 112 and 116, memories 111, 120 and 132). Further, stops as disclosed in method 400 may include retrieving, editing, and/or storing files in a database that is part of, or is communicably coupled to, the computer, using, inter alia, the presence analysis engine. The database may include a client device database (e.g., client device database 152). Methods consistent with the present disclosure may include at least some, but not all, of the steps illustrated n method 400, performed in a different sequence. Furthermore, methods consistent with the present disclosure may include at least two or more steps as in method 400 performed overlapping in time, or almost simultaneously.

Step 402 includes receiving, in a client device, a tracking query from a network device using a first connectivity mode, wherein the network device hosts a LAN.

Step 404 includes providing, to the network device, an identification information of the client device using the first connectivity mode.

Step 406 includes receiving, from the network device, a query for a status of a second connectivity mode that is available for the LAN.

Step 408 includes receiving, from the network device, a configuration parameter for the second connectivity mode.

In some embodiments, step 408 further includes modifying a setting in a communications module of the client device based on the configuration parameter for the second connectivity mode.

Step 410 includes accessing, with the client device, the LAN via the second connectivity mode. In some embodiments, step 610 further includes providing an authentication credential to the network device for accessing the LAN via the first connectivity mode. In some embodiments, step 410 further includes accessing the LAN via a third connectivity mode when the second connectivity mode is unavailable for the client device.

Hardware Overview

Figure 5:
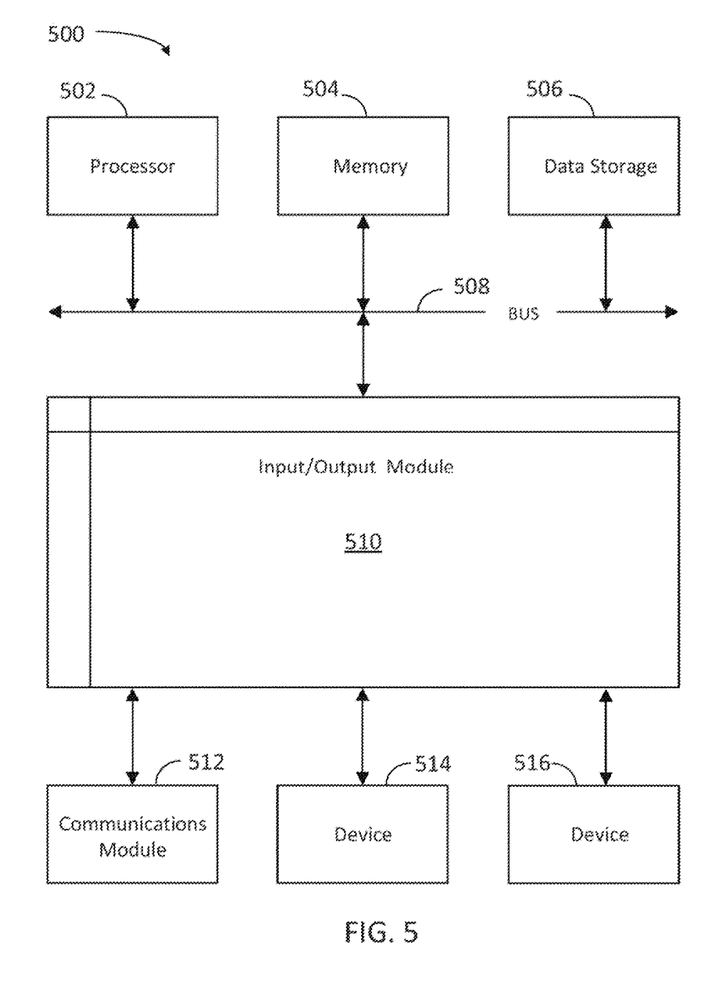
FIG. 5 is a block diagram illustrating an example computer system with which the client and network device of FIG. 1 and the methods of FIGS. 2-4 can be implemented.

FIG. 5 is a block diagram illustrating an exemplary computer system 500 with which the client device 110 and server 130 of FIG. 1, and the methods of FIGS. 2-4, can be implemented. In certain aspects, the computer system 500 may be implemented using hardware or a combination of software and hardware, either in a dedicated network device, or integrated into another entity, or distributed across multiple entities.

Computer system 500 (e.g., client device 110 and server 130) includes a bus 508 or other communication mechanism for communicating information, and a processor 502 (e.g., processors 112 and 136) coupled with bus 508 for processing information. By way of example, the computer system 500 may be implemented with one or more processors 502. Processor 502 may be a general-purpose microprocessor, a microcontroller, a Digital Signal Processor (DSP), Application Specific integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memories 11, 120 and 132), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, e.g., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm Languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed heroin does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage 506 such as a magnetic disk or optical disk, coupled to bus 508 for storing in and instructions. Computer system 500 may be coupled via input/output module 510 to various devices. Input/output module 510 can be any input/output module. Exemplary input/output modules 510 include data ports such as USB ports. The input/output module 510 is configured to connect to a communications module 512. Exemplary communications modules 512 (e.g., communications modules 118 and 138) include networking interface cards, such as Ethernet cards and modems. In certain aspects, input/output module 510 is configured to connect to a plurality of devices, such as an input device 514 (e.g., input device 114) and/or an output device 516 (e.g., output device 116). Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 516 include display devices, such as an LCD (liquid crystal display) monitor, for displaying information to the user.

According to one aspect of the present disclosure, the client device 110 and server 130 can be implemented using a computer system 500 in response to processor 502 executing one or more sequences of one or more instructions contained in memory 504. Such instructions may be read into memory 504 from another machine-readable medium, such as data storage 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data network device, or that includes a middleware component, e.g., an application network device, or that includes a from end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and network devices. A client and network device are generally remote front each other and typically interact through a communication network. The relationship of client and network device arises by virtue of computer programs, running on the respective computers and having a client-network device relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage 506. Volatile media include dynamic memory, such as memory 504. Transmission media include coaxial cables, copper wire, and fiber optics, including the wires forming bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase at least one of preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, of C" each refer to only only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to L construed as preferred or advantageous over other embodiments.

A reference to an element in the singular is not intended to mean "one and one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations bee performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A network device of a wireless network, comprising: processing circuitry; and
a memory including instructions that, when executed by the processing circuitry, cause the network device to:
identify, using Bluetooth, a client device within a wireless coverage area of the wireless network, the client device associated with a user;
predict, using a machine learning algorithm, a first Wireless Fidelity (Wi-Fi) address associated with the user;
determine that the associated user has not attempted to log in via the first Wi-Fi address using the client device;
predict, using the machine learning algorithm, a second Wi-Fi address associated with the user;
determine that the associated user has not attempted to log in via the second Wi-Fi address using the client device;
determine that the client device is not active on Wi-Fi; and
transmit a configuration parameter to the client device commanding the client device to enable Wi-Fi.

2. The network device of claim 1, wherein the client device is a mobile device.

3. The network device of claim 1, wherein the client device includes an application that transmits Bluetooth signals to the network device on a periodic basis.

4. The network device of claim 1, wherein the network device is a wireless access point.

5. The network device of claim 1, wherein predicting the first Wi-Fi address and predicting the second Wi-Fi address comprise selecting the respective addresses from a list of Wi-Fi addresses associated with the user based which address is most likely to be used by the client device.

6. The network device of claim 1, wherein the first Wi-Fi address and the second Wi-Fi address are Internet Protocol (IP) addresses.

7. The network device of claim 1, including instructions to alert a network administrator upon determining that the associated user has not attempted to log in via the first Wi-Fi address.

8. The network device of claim 1, wherein the machine learning algorithm is a neural network.

9. A method, comprising:
identifying, using Bluetooth on a network device, a client device within a wireless coverage area of the wireless network, the client device associated with a user;
predicting, using a machine learning algorithm, a first Wireless Fidelity (Wi-Fi) address associated with the user;
determining that the associated user has not attempted to log in via the first Wi-Fi address using the client device;
predicting, using the machine learning algorithm, a second Wi-Fi address associated with the user;
determining that the associated user has not attempted to log in via the second Wi-Fi address using the client device;
determining that the client device is not active on Wi-Fi; and
transmitting a configuration parameter to the client device commanding the client device to enable Wi-Fi.

10. The method of claim 9, wherein the client device is a mobile device.

11. The method of claim 9, wherein the client device includes an application that transmits Bluetooth signals to the network device on a periodic basis.

12. The method of claim 9, wherein the network device is a wireless access point.

13. The method of claim 9, wherein predicting the first Wi-Fi address and predicting the second Wi-Fi address comprise selecting the respective addresses from a list of Wi-Fi addresses associated with the user based which address is most likely to be used by the client device.

14. The method of claim 9, wherein the first Wi-Fi address and the second Wi-Fi address are Internet Protocol (IP) addresses.

15. The method of claim 9, further comprising alerting a network administrator upon determining that the associated user has not attempted to log in via the first Wi-Fi address.

16. The method of claim 9, wherein the machine learning algorithm is a neural network.

17. A system, comprising:
a network device of a wireless network, comprising a memory including instructions that cause the network device to:
identify, using Bluetooth, a client device within a wireless coverage area of the wireless network, the client device associated with a user;
predict, using a machine learning algorithm, a first Wireless Fidelity (Wi-Fi) address associated with the user;
determine that the associated user has not attempted to log in via the first Wi-Fi address using the client device;
predict, using the machine learning algorithm, a second Wi-Fi address associated with the user;
determine that the associated user has not attempted to log in via the second Wi-Fi address using the client device;
determine that the client device is not active on Wi-Fi; and
transmit a configuration parameter to the client device commanding the client device to enable Wi-Fi; and
the client device, comprising a memory including instructions that cause the client device to:
receive a tracking query from the network device;
transmit identification information to the network device;

receive a configuration parameter from the network device; and enable a Wi-Fi component.

18. The system of claim 17, wherein the client device is a mobile device.

19. The system of claim 17, wherein the network device is a wireless access point.

20. The system of claim 17, wherein the first Wi-Fi address and the second Wi-Fi address are Internet Protocol (IP) addresses.

* * * * *